United States Patent
Xu et al.

(10) Patent No.: US 12,067,081 B2
(45) Date of Patent: Aug. 20, 2024

(54) TRANSFERABLE VISION TRANSFORMER FOR UNSUPERVISED DOMAIN ADAPTATION

(71) Applicant: KWAI INC., Palo Alto, CA (US)

(72) Inventors: Ning Xu, Irvine, CA (US); Jingjing Liu, Santa Clara, CA (US); Jinyu Yang, Arlington, TX (US)

(73) Assignee: KWAI INC., Palo Alto, CA (US)

( * ) Notice: Subject to any disclaimer, the term of this patent is extended or adjusted under 35 U.S.C. 154(b) by 77 days.

(21) Appl. No.: 17/485,251

(22) Filed: Sep. 24, 2021

(65) Prior Publication Data

US 2023/0062151 A1 Mar. 2, 2023

Related U.S. Application Data

(60) Provisional application No. 63/231,680, filed on Aug. 10, 2021.

(51) Int. Cl.
*G06N 3/02* (2006.01)
*G06F 18/21* (2023.01)
(Continued)

(52) U.S. Cl.
CPC ...... *G06F 18/2148* (2023.01); *G06F 18/2132* (2023.01); *G06F 18/2155* (2023.01);
(Continued)

(58) Field of Classification Search
CPC .......... G06N 3/045; G06N 20/00; G06N 3/08; G06N 3/096; G06N 3/0455; G06N 20/20;
(Continued)

(56) References Cited

U.S. PATENT DOCUMENTS

| | | | |
|---|---|---|---|
| 2021/0374947 A1* | 12/2021 | Shin | G06V 10/776 |
| 2021/0398333 A1* | 12/2021 | Kalu | G06V 10/462 |
| 2023/0072293 A1* | 3/2023 | Koh | G06N 3/045 |

FOREIGN PATENT DOCUMENTS

| | | | |
|---|---|---|---|
| WO | WO-2022243985 A1 | * | 11/2022 |
| WO | WO-2023277919 A1 | * | 1/2023 |

OTHER PUBLICATIONS

Xu et al., CDTrans: Cross-domain Transformer for Unsupervised Domain Adaptation, Sep. 13, 2021 [retrieved Apr. 8, 2023], Cornell University: arXiv open-access archive, 9 pages. Retrieved: https://arxiv.org/abs/2109.06165v1# (Year: 2021).*

(Continued)

*Primary Examiner* — Matthew C Bella
*Assistant Examiner* — Dennis Rosario
(74) *Attorney, Agent, or Firm* — Arch & Lake LLP

(57) ABSTRACT

A method and an apparatus for training a transferable vision transformer (TVT) for unsupervised domain adaption (UDA) in heterogeneous devices are provided. The method includes that a heterogeneous device including one or more graphic processing units (GPUs) loads multiple patches into the TVT which includes a transferability adaption module (TAM). Furthermore, a patch-level domain discriminator in the TAM assigns weights to the multiple patches and determines one or more transferable patches based on the weights. Moreover, the heterogeneous device generates a transferable attention output for an attention module in the TAM based on the one or more transferable patches.

20 Claims, 8 Drawing Sheets

---

Load multiple patches into a transferable vision transformer (TVT), wherein the TVT includes a transferability adaption module (TAM)
502

Assign, by a patch-level domain discriminator in the TAM, weights to the multiple patches, and determine, by the patch-level domain discriminator, one or more transferable patches based on the weights
504

Generate a transferable attention output for an attention module in the TAM based on the one or more transferable patches
506

(51) Int. Cl.
G06F 18/2132 (2023.01)
G06F 18/214 (2023.01)
G06N 3/094 (2023.01)
G06N 3/096 (2023.01)
G06V 10/44 (2022.01)
G06V 10/82 (2022.01)

(52) U.S. Cl.
CPC ........... *G06F 18/2178* (2023.01); *G06N 3/02* (2013.01); *G06N 3/094* (2023.01); *G06N 3/096* (2023.01); *G06V 10/454* (2022.01); *G06V 10/82* (2022.01); *G06T 2207/20081* (2013.01); *G06T 2207/20084* (2013.01)

(58) Field of Classification Search
CPC .... G06N 3/088; G06N 3/0985; G06N 3/0475; G06N 3/0464; G06N 3/02; G06N 3/094; G06N 3/042; G06V 10/70; G06V 10/82; G06V 10/764; G06V 30/413; G06V 10/50; G06V 30/19173; G06V 40/172; G06V 30/18057; G06V 10/774; G06V 10/454; G06V 10/44; G06V 10/42; G06T 2207/20084; G06T 2207/20081; G06T 3/4046; G06T 11/00; G06T 2207/20021; G06T 7/11; G06T 9/002; G06T 7/74; G06F 18/214; G06F 18/217; G06F 18/24; G06F 30/27; G06F 40/56; G06F 40/284; G05B 13/027
See application file for complete search history.

(56) References Cited

OTHER PUBLICATIONS

Dosovitskiy et al., An Image is Worth 16X16 Words: Transformers for Image Recognition at Scale, Jun. 3, 2021 [retrieved Apr. 8, 2023], Cornell University: arXiv open-access archive, 22 pages. Retrieved: https://arxiv.org/abs/2010.11929 (Year: 2021).*
Foreign Priority Data: 776441 May 21, 2021 (May 21, 2021) NZ to Conder et al.: WO 2022/243985 A1, 21 pages. (Year: 2021).*
Sandouka et al., Transformers and Generative Adversarial Networks for Liveness Detection in Multitarget Fingerprint Sensors, Jan. 20, 2021 [retrieved Apr. 8, 2023], Sensors 2021, vol. 21, Issue 3, 17 pages. Retrieved: https://www.mdpi.com/1424-8220/21/3/699 (Year: 2021).*
Wang et al., Transferable Attention for Domain Adaptation, Jul. 17, 2019 [retrieved Nov. 30, 2023], Proceedings of the AAAI Conference on Artificial Intelligence, vol. 33, No. 01, pp. 5345-5352. Retrieved: https://ojs.aaai.org/index.php/AAAI/article/view/4472 (Year: 2019).*
Devlin et al., BERT: Pre-training of Deep Bidirectional Transformers for Language Understanding, May 24, 2019 [retrieved Nov. 30, 2023], Cornell University:arXiv, version 2, 16 pages. Retrieved: https://arxiv.org/abs/1810.04805 (Year: 2019).*
Bello, et al., "Attention Augmented Convolutional Networks" CVF Open Access provided by the Computer Vision Foundation in Proceedings of the IEEE/CVF International Conference on Computer Vision, (10p).
Beltagy, I., et al., "Long-former: The long-document transformer" arXiv preprint arXiv: 2004.05150, (17p), has CLS token at the beginning.
Borgwardt, K., et al., "Integrating structured biological data by kernel maximum means discrepancy", Bioinformatics vol. 22, No. 14 (2006), (9p).
Bridle, J.S. et al., "Unsupervised classifiers, mutual information and phantom targets", 1992, (6p).
Carion, N., et al., End-to-end object detection with transformers, European Conference on Computer Vision, May 28, 2020, (26p).
Chapelle, O. et al., "Semi-supervised classification by low density separation", International workshop on artificial intelligence and statistics, 2005, (8p).
Chen, C., et al., "Progressive Feature Alignment for Unsupervised Domain Adaptation", CVF Open Access provided by Computer Vision Foundation, 2019. (10p).
Chen, M., et al., "Adversarial-learned loss for domain adaptation," Proceedings of the AAAI Conference on Artificial Intelligence, vol. 34, 2020 (8p).
Devlin, J. et al., "Pre-training of deep bidirectional transformers for language understanding", arXiv preprint arXiv. 2018, (16p).
Dosovitskiy, Alexey, et al."An Image is Worth 16x16 Words: Transformers for Image Recognition at Scale",Published conference paper at ICLR 2021, arXiv:2010.11929v2 [cs.CV], Jun. 3, 2021, (22p), being applied in a rejection.
Ganin, Yaroslav, et al., "Unsupervised domain adaptation by backpropagation", International conference on machine learning, 2015, (10p).
Ganin, Yaroslav, et al., "Domain-Adversarial Training of Neural Networks", Journal of Machine Learning Research 17 (2016), (35p).
Girdhar, R., et al., "Video action transformer network", Proceedings of the IEEE/CVF Conference on Computer Vision and Pattern Recognition, 2019, (10p).
Gomes, R., et al., "Discriminative clustering by regularized information maximization", 2010, (9p).
Goodfellow, I.J. et al., "Generative adversarial networks", arXiv preprint arXiv, DOI:10.1145/3422622, (6p).
He, K. et al., "Deep residual learning for image recognition", Proceedings of the IEEE conference on computer vision and pattern recognition, 2016 (9p).
Hoffman, J., et al., "Cycada: Cycle-consistent adversarial domain adaptation", International conference on machine learning, 1989-1998, (10p).
Hu, H. et al., "Relation networks for object detection", Proceedings of the IEEE Conference on Computer Vision and Pattern Recognition, 2018, (10p).
Hu, W. et al., "Learning Discrete Representations via Information Maximizing Self-Augmented Training", International conference on machinee learning, 2017. (10p).
Krizhevsky, A. et al., "Image Net Classification with Deep Convolutional Neural Networks", DOI: 10.1145/3065386, Advances in neural information processing systems, 2012, (7p).
LeCun, Y. et al., "Gradient-Based Learning Applied to Document Recognition", Proceedings of the IEEE, 86(11), 1998, (47p).
Lee, S et al., "Drop to adapt: Learning discriminative features for unsupervised domain adaptation", Proceedings of the IEEE/CVF International Conference on Computer Vision, 2019, (10p).
Liang, J. et al., "Do we really need to access the source data? source hypothesis transfer for unsupervised domain adaptation", International Conference on Machine Learning, 2020, (12p).
Liu, H. et al., "Transferable adversarial training: A general approach to adapting deep classifers", International Conference on Machine Learning, 2019, (10p).
Liu, Z. et al., "Swin transformer: Hierarchical vision transformer using shifted windows", arXiv preprint arXiv, 2021, (11p).
Long, M. et al., "Learning transferable features with deep adaptation networks", International conference on machine learning, 2015, (9p).
Long, M. et al., "Conditional Adversarial Domain Adaptation", arXiv preprint arXiv, 2017, (11p).
Long, M. et al., Deep transfer learning with joint adaptation networks, International conference on machine learning, 2017, (10p).
Neimark, D. et al., "Video transformer network", arXiv preprint arXiv, 2021, (10p).
Netzer, Y. et al., "Reading Digits in Natural Images with Unsupervised Feature Learning"., 2011, (9p).
Pan, S. et al., "A survey on transfer learning", IEEE Transactions on knowledge and data engineering, 22(10), 2009, (15p), assigns weight.
Pei, Z. et al., "Multi-adversarial domain adaptation", Proceedings of the AAAI Conference on Artificial Intelligence, vol. 22, 2018, (8p).

(56) References Cited

OTHER PUBLICATIONS

Peng, X. et al., "Visda: The visual domain adaptation challenge", arXiv preprint arXiv, 2017, (17p).
Saenko, Kate et al., "Adapting Visual Category Models to New Domains", European conference on computer vision, 2010, (14p).
Saito, K. et al., "Maximum Classifier Discrepancy for Unsupervised Domain Adaptation", CVF Open Access version provided by the Computer Vision Foundation in Proceedings of the IEE conference on computer vision and pattern recognition, 2018, (10p).
Shi, Y et al., "Information-theoretical learning of discriminative clusters for unsupervised domain adaptation", arXiv prepeint arXiv, 2012, (8p).
Tzeng, E. et al., "Adversarial discriminative domain adaptation", Proceedings of the IEEE conference on computer vision and pattern recognition, 2017, (10p).
Tzeng, E. et al., "Deep domain confusion: maximizing for domain invariance", 2014 Preprint arXiv, 2014, (9p).
Vaswani, A., et al., "Attention Is All You Need", arXiv preprint arXiv, 2017, (11p), assigns weight.
Venkateswara, H. et al., "Deep Hashing Network for Unsupervised Domain Adaptation", Proceedings of the IEEE conference on computer vision and pattern recognition, 2017, (10p).
Wang, M. et al., "Deep visual domain adaptation: A survey", Neurocomputing, 2018, (20p).
Wang, W. et al., "Pyramid vision transformer: A versatile backbone for dense prediction without convolutions", arXiv preprint arXiv, 2021, (11p).
Wang, X. et al., "Non-local neural networks", Proceedings of the IEEE conference on computer vision and pattern recognition, 2018, (10p).
Wang, X. et al., "Transferable attention for domain adaptation", Proceedings of the AAAI Conference on Artificial Intelligence, vol. 33, 2019, (8p).
Wang, Y. et al., "End-to-End Video Instance Segmentation with Transformers", arXiv preprint arXiv, 2020, (10p).
Ying, W. et al., "Transfer Learning via Learning to Transfer", International Conference on Machine Learning, 2018, (10p).
Yosinski, J. et al., "How transferable are feature in deep neural networks?" arXiv preprint arXiv, 2014, (9p).
Zheng, S. et al., "Rethinking Semantic Segmentation from a Sequence-to-Sequence Perspective with Transformers", arXiv preprint arXiv, 2020, (10p).
Zhou, H. et al., "Informer: Beyond Efficient Transformer for Long Sequence Time-Series Forecasting", arXiv preprint arXiv, 2020, (10p).
Zhu, X. et al., "Deformable detr: Deformable transformers for end-to-end object detection", arXiv preprint arXiv, 2020, (16p), has weight range.
Deng, Jia et al., "ImageNet: a Large-Scale Hierarchical Image Database", Conference Paper in Proceedings/CVPR, IEEE Computer Society Conference on Computer Vision and Pattern Recognition, IEEE Computer Society Conference on Computer Vision and Pattern Recognition, Jun. 2009, (9p).

\* cited by examiner

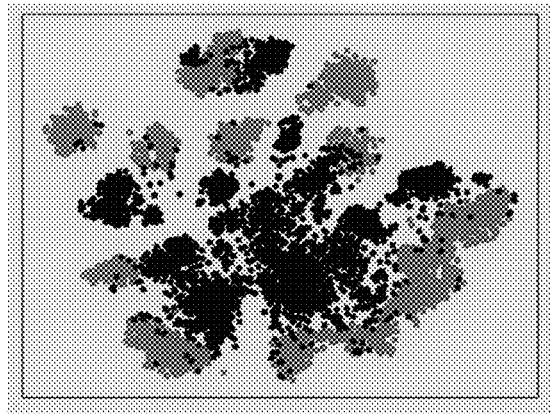
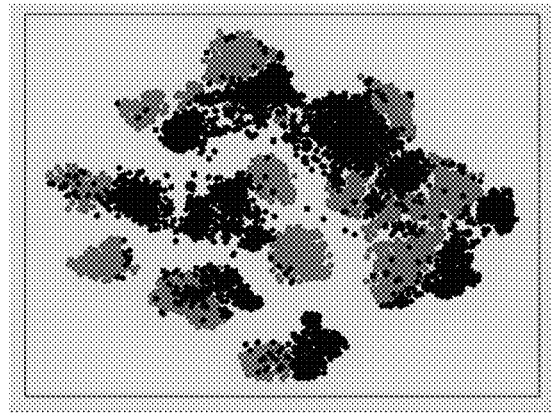
FIG. 2A
FIG. 2B
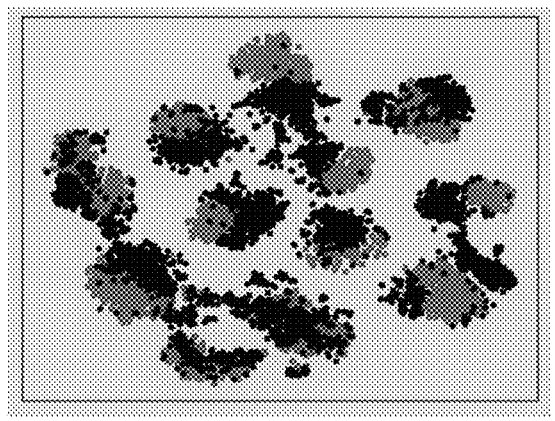
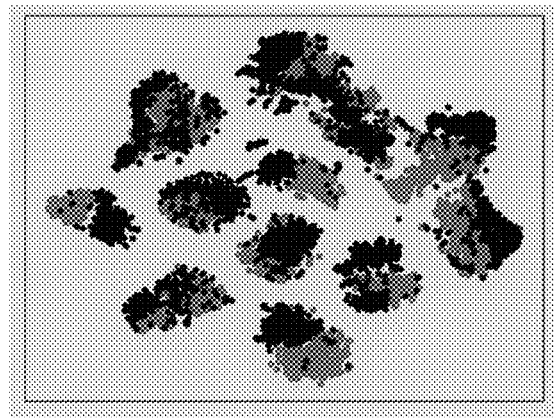
FIG. 2C
FIG. 2D

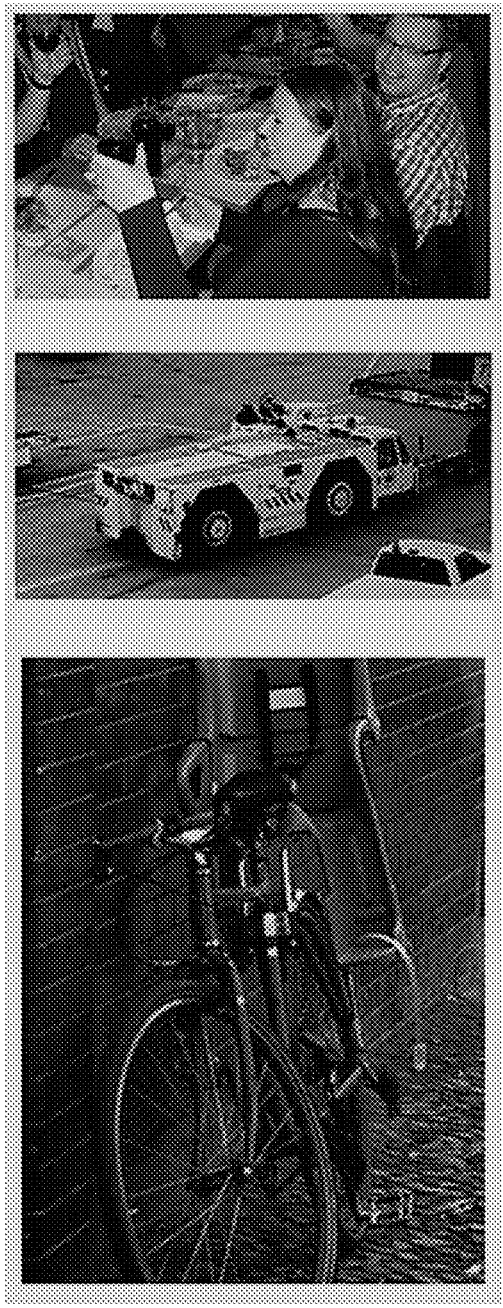
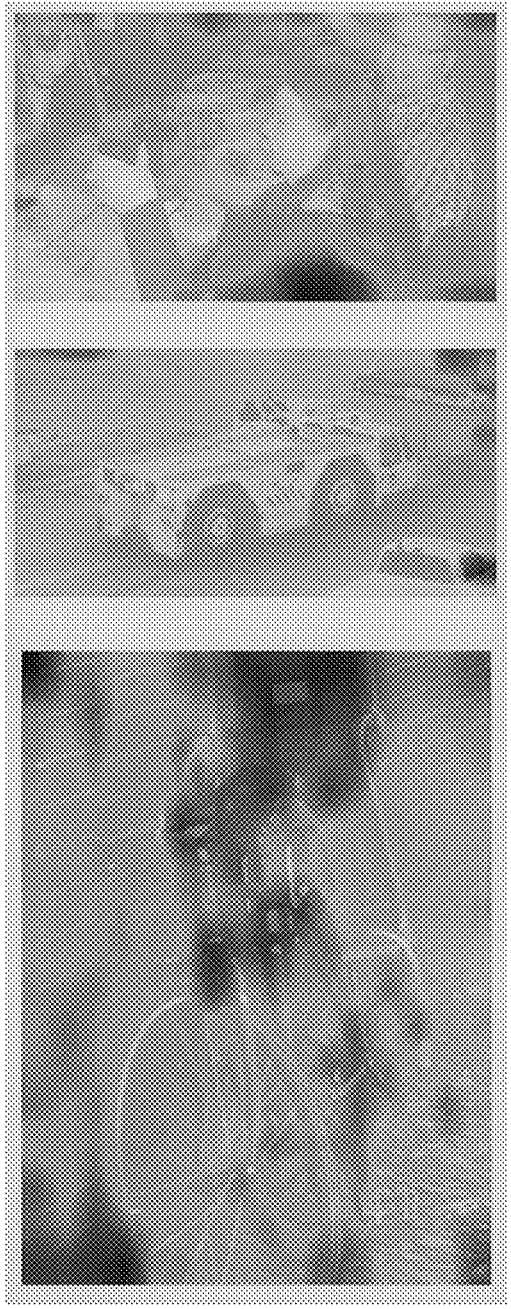
FIG. 3A                    FIG. 3B

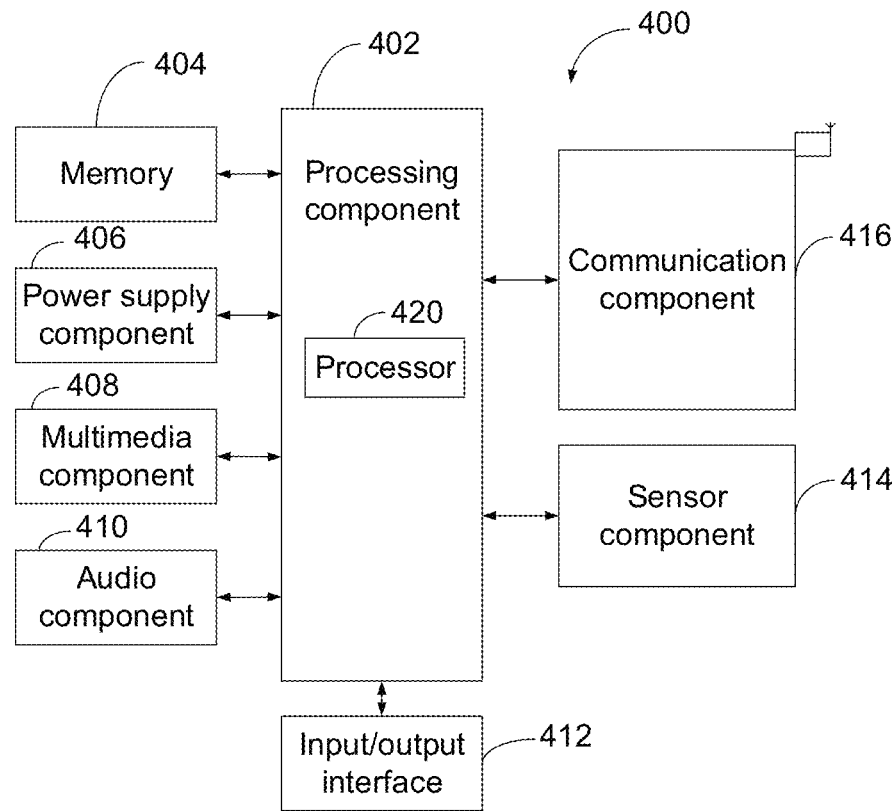

FIG. 4

Load multiple patches into a transferable vision transformer (TVT), wherein the TVT includes a transferability adaption module (TAM)　502

Assign, by a patch-level domain discriminator in the TAM, weights to the multiple patches, and determine, by the patch-level domain discriminator, one or more transferable patches based on the weights　504

Generate a transferable attention output for an attention module in the TAM based on the one or more transferable patches　506

FIG. 5

TRANSFERABLE VISION TRANSFORMER FOR UNSUPERVISED DOMAIN ADAPTATION

CROSS-REFERENCE TO RELATED APPLICATION

The present application claims priority to U.S. Provisional Application No. 63/231,680, entitled "Transferable Vision Transformer for Unsupervised Domain Adaptation," filed on Aug. 10, 2021, the entirety of which is incorporated by reference for all purposes.

FIELD

The present disclosure relates to a transferable vision transformer (TVT), and in particular but not limited to, a TVT for unsupervised domain adaption.

BACKGROUND

Unsupervised domain adaptation (UDA) aims to transfer the knowledge learnt from a labeled source domain to an unlabeled target domain. Previous work is mainly built upon convolutional neural networks (CNNs) to learn domain-invariant representations. With the recent exponential increase in applying Vision Transformer (ViT) to vision tasks, the capability of ViT in adapting cross-domain knowledge, however, remains unexplored.

Deep neural networks (DNNs) demonstrate unprecedented achievements on various machine learning problems and applications. However, such impressive performance heavily relies on massive amounts of labeled data which requires considerable time and labor efforts to collect. Therefore, it is desirable to train models that can leverage rich labeled data from a different but related domain and generalize well on target domains with no or limited labeled examples. Unfortunately, the canonical supervised-learning paradigm suffers from the domain shift issue that poses a major challenge in adapting models across domains. This motivates the research on unsupervised domain adaptation (UDA) which is a special scenario of transfer learning. The key idea of UDA is to project data points of the labeled source domain and the unlabeled target domain into a common feature space, such that the projected features are both discriminative (semantic meaningful) and domain-invariant, in turn, generalize well to bridge the domain gap.

SUMMARY

The present disclosure provides examples of techniques relating to TVT for UDA in heterogeneous devices.

According to a first aspect of the present disclosure, there is provided a method training a TVT for UDA in heterogeneous devices. The method includes a heterogeneous device including one or more graphic processing units (GPUs) loads multiple patches into the TVT, where the TVT includes a transferability adaption module (TAM).

Additionally, the method includes that a patch-level domain discriminator in the TAM assigns weights to the multiple patches and determines one or more transferable patches based on the weights. Furthermore, the method includes that the heterogeneous device generates a transferable attention output for an attention module in the TAM based on the one or more transferable patches.

According to a second aspect of the present disclosure, there is provided an apparatus for training a TVT for UDA in heterogeneous devices. The apparatus includes one or more processors and a memory configured to store instructions executable by the one or more processors. Upon execution of the instructions, the one or more processors are configured to load multiple patches into the TVT, where the TVT includes a TAM.

Additionally, the one or more processors are configured to assign, by a patch-level domain discriminator in the TAM, weights to the multiple patches, and determine, by the patch-level domain discriminator, one or more transferable patches based on the weights. Furthermore, the one or more processors are configured to generate a transferable attention output for an attention module in the TAM based on the one or more transferable patches.

According to a third aspect of the present disclosure, there is provided a non-transitory computer-readable storage medium for AMPR storing computer-executable instructions that, when executed by one or more computer processors, causing the one or more computer processors to perform acts including: loading multiple patches into the TVT, where the TVT includes a TAM; assigning, by a patch-level domain discriminator in the TAM, weights to the multiple patches, and determining, by the patch-level domain discriminator, one or more transferable patches based on the weights; and generating a transferable attention output for an attention module in the TAM based on the one or more transferable patches.

BRIEF DESCRIPTION OF THE DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 2A illustrate t-SNE visualization of VisDA-2017 dataset based on Source Only ViT in accordance with some implementations of the present disclosure.

FIG. 2B illustrate t-SNE visualization of VisDA-2017 dataset based on Baseline in accordance with some implementations of the present disclosure.

FIG. 2C illustrates t-SNE visualization of VisDA-2017 dataset based on TAM in accordance with some implementations of the present disclosure.

FIG. 2D illustrates t-SNE visualization of VisDA-2017 dataset based on TVT in accordance with some implementations of the present disclosure.

FIG. 3A illustrates three real images of person, truck, and bicycle in VisDA-2017 dataset.

FIG. 3B illustrates attention map visualization of the person, the truck, and the bicycle as shown in FIG. 3A based on Source Only ViT in accordance with some implementations of the present disclosure.

FIG. 4 is a block diagram illustrating an apparatus for training a TVT for UDA in accordance with some implementations of the present disclosure.

FIG. 5 is a flowchart illustrating a process of training a TVT for UDA in accordance with some implementations of the present disclosure.

DETAILED DESCRIPTION

Figure 1A:
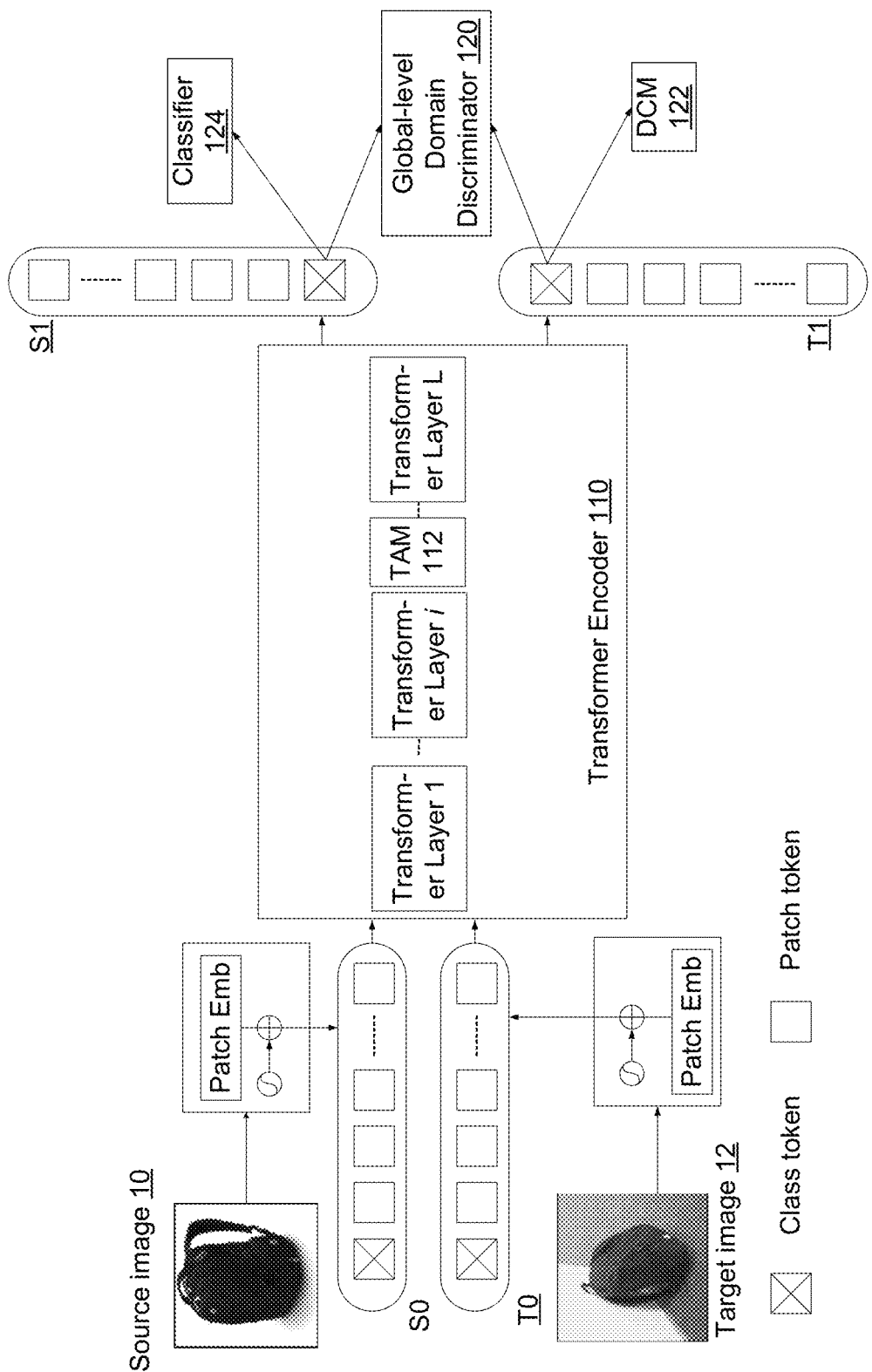
FIG. 1A is a block diagram illustrating an example of a transformer encoder in accordance with some implementations of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

Throughout the disclosure, the terms "first," "second," "third," etc. are all used as nomenclature only for references to relevant elements, e.g., devices, components, compositions, steps, etc., without implying any spatial or chronological orders, unless expressly specified otherwise. For example, a "first device" and a "second device" may refer to two separately formed devices, or two parts, components, or operational states of a same device, and may be named arbitrarily.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. The method may be implemented with both the capability of performing function or action X', and the capability of performing function or action Y'. Thus, the functions X' and Y' may both be performed, at different times, on multiple executions of the method.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

ViT has received increasing attention in the vision community. Different from CNNs that act on local receptive fields of the given image, ViT models long-range dependencies among visual features across the entire image, through the global self-attention mechanism. Specifically, in ViT, each image is split into a sequence of fixed-size non-overlapping patches, which are then linearly embedded and concatenated with position embeddings. To be consistent with NLP paradigm, a class token is prepended to the patch tokens, serving as the representation of the whole image. Then, those sequential embeddings are fed into a stack of transformers to learn desired visual representations. Due to its advantages in global context modeling, ViT has obtained excellent results on various vision tasks, such as image classification, object detection, segmentation, and video understanding.

Despite that ViT is becoming increasingly popular, two questions related to domain adaption remain unanswered. The first question is how transferable ViT is across different domains, compared to its CNNs counterparts. As ViT is convolution-free and lacks some inductive bias inherent to CNNs, e.g., locality and translation equivariance, it relies on large-scale pre-training to trump inductive bias. Such training prerequisite along with the learned global attentions may provide ViT with outstanding capability in domain transferring, yet this hypothesis has not been investigated. The second question is how to properly improve ViT in adapting different domains. One intuitive approach is to directly apply adversarial discriminator onto the class tokens to perform adversarial alignment, where the state of a class token represents the entire image. However, cross-domain alignment of such global features assumes all regions or aspects of the image have equal transferability and discriminative potential, which is not always tenable. For instance, background regions can be easier aligned across domains while foreground regions are more discriminative. In other words, some discriminative features may lack transferability, and some transferable features may not contribute much to the downstream task, e.g., classification. Therefore, in order to properly enhance the transferability of ViT, it is desirable to identify fine-grained features that are both transferable and discriminative.

The present disclosure provides answers to the two aforementioned questions. Firstly, to fill the blank of understanding ViT's transferability, this disclosure first conducts a comprehensive study of vanilla ViT on public UDA benchmarks. As expected, the experimental results demonstrate that ViT is more transferable than its strong CNNs-based counterparts, which can be partially explained by the global context modeling and large-scale pre-training. Besides, further improvements by applying an adversarial discriminator to the class tokens of ViT, which only aligns global representations. However, such strategy suffers from the oversimplified assumption and ignores the inherent properties of ViT that are beneficial for domain adaptation: i) sequential patch tokens actually give us the free access to fine-grained features; ii) the self-attention mechanism in transformer naturally works as a discriminative probe. In the light of this, this disclosure provides a unified UDA framework that makes full use of ViT's inherent merits. This disclosure names it TVT.

One of the key ideas of the disclosed method is to retain both transferable and discriminative features which are essential in knowledge adaptation. To achieve this goal, this disclosure first introduces the TAM built upon a conventional transformer. TAM uses a patch-level domain discriminator to measure the transferabilities of patch tokens, and injects learned transferabilities into the multi-head self-attention block of a transformer. On one hand, the attention weights of patch tokens in the self-attention block are used to determine their semantic importance, i.e., the features with larger attention are more discriminative yet without transferability guarantees. On the other hand, as patch tokens can be regarded as fine-grained representations of an image, the higher transferability of a token means the local features are more transferable across domains though not necessarily discriminative. By simply replacing the last transformer of ViT with a plug-and-play TAM, this disclosure could drive ViT to focus on both transferable and discriminative features.

Since in this disclosure, the method performs adversarial adaptation that forces the learned features of two domains to be similar, one underlying side-effect is that the discriminative information of target domain might be destroyed during feature alignment. To address this problem, this disclosure designs a Discriminative Clustering Module (DCM) inspired by the clustering assumption. The motivation is to enforce the individual target prediction close to one-hot encoding (well separated) and the global target prediction to be uniformly distributed (global diverse), such that the learnt target-domain representation could retain maximum discriminative information about the input values.

This disclosure is the first investigating the capability of ViT in transferring knowledge on the domain adaptation task, which gives good insights to understand and explore ViT's transferability while applied to various vision tasks.

Additionally, this disclosed TAM delicately leverages the intrinsic characteristics of ViT, such that the method can capture both transferable and discriminative features for domain adaptation. Moreover, this disclosure adopts discriminative clustering assumption to alleviate the discrimination destruction during adversarial alignment.

Furthermore, without any bells and whistles, the disclosed method sets up a new competitive baseline cross several public UDA benchmarks.

UDA

Transfer learning aims to learn transferable knowledge that are generalizable across different domains with different distributions. This is built upon the evidence that feature representations in machine learning models, especially in deep neural networks, are transferable. The main challenge of transfer learning is to reduce the domain shift or the discrepancy of the marginal probability distributions across domains. In the past decades, various methods have been proposed to address one canonical transfer learning problem, i.e., UDA, where no labels are available for the target domain. For instance, DDC attempted to learn domain-invariant features by minimizing Maximum Mean Discrepancy (MMD) between two domains. DDC is further improved by embedding hidden representations of all task-specific layers in a reproducing Hilbert space and used a multiple kernel variant of MMD to measure the domain distance. It is proposed to align joint distributions of multiple domain-specific layers across domains through a joint maximum mean discrepancy metric. Another line of effort was inspired by the success of adversarial learning. By introducing a domain discriminator and modeling the domain adaption as a minimax problem, an encoder is trained to generate domain-invariant features, through deceiving a discriminator which tries to distinguish features of source domain from that of target domain.

It is noteworthy that all of these methods completely or partially used CNNs as the fundamental block. By contrast, the disclosed method explores ViT to tackle the UDA problem, as this disclosure believe ViT has better potential and capability in domain adaptation owing to some of its properties. Although previous UDA methods, e.g., adversarial learning, are able to improve vanilla ViT to some extent, they were not well designed for transformer-based models, and thereby cannot leverage ViT's inherent characteristic of providing attention information and fine-grained representations. However, the method in this disclosure is delicately designed with the nature of ViT and could effectively leverages the transferability and discrimination of each feature for knowledge transfer, thus having better chance in fully exploiting the adaptation power of ViT.

Vision Transformer

Transformers was firstly proposed in the Natural Language Processing (NLP) field and demonstrate record-breaking performance on various language tasks, e.g., text classification and machine translation. Much of such impressive achievement is attributed to the power of capturing long-range dependencies through attention mechanism. Spurred by this, some recent studies attempted to integrate attention into CNNs to augment feature maps, aiming to provide the capability in modeling heterogeneous interactions. Another pioneering work of completely convolution-free architecture is Vision Transformer (ViT), which applied transformers on a sequence of fixed-size non-overlapping image patches. Different from CNNs that rely on image-specific inductive biases, e.g., locality and translation equivariance, ViT takes the benefits from large-scale pre-training data and global context modeling. One such method, known for its simplicity and accuracy/compute trade-off, competes favorably against CNNs on the classification task and lays the foundation for applying transformer to different vision tasks. ViT and its variants have proved their wide applicability in object detection, segmentation, and video understanding, etc.

Despite the success of ViT on different vision tasks, to the best of our knowledge, neither their transferability nor the design of UDA methods with ViT have been previously discussed in the literature. To this end, this disclosure focuses on the investigation of ViT's capability in knowledge transferring across different domains. This disclosure provides a novel UDA framework tailored for ViT by exploring its intrinsic merits and prove its superiority over existing methods.

Adversarial Learning UDA

This disclosure considers the image classification task in UDA, where a labeled source domain $D_s\{(x_i^s, y_i^s)\}_{i=1}^{n_s}$ with $n_s$ examples and an unlabeled target domain $D_t\{x_j^t\}_{j=1}^{n_t}$ with $n_t$ examples are given. The goal of UDA is to learn features that are both discriminative and invariant to the domain discrepancy, and in turn guarantee accurate prediction on the unlabeled target data. Here, a common practice is to jointly performs feature learning, domain adaptation, and classifier learning by optimizing the following loss function:

$$L_{clc}(x^s,y^s)+\alpha L_{dis}(x^s,x^t) \qquad (1)$$

where $L_{clc}$ is supervised classification loss, $L_{dis}$ is a transfer loss with various possible implementations, and $\alpha$ is used to control the importance of $L_{dis}$. One of the most commonly used $L_{dis}$ is the adversarial loss which encourages a domain-invariant feature space through a domain discriminator.

Self-Attention Mechanism

The main building block of ViT is MSA, which is used in the transformer to capture long-range dependencies. Specifically, MSA concatenates multiple scaled dot-product attention (SA) modules/kernels, where each SA module/kernel takes a set of queries (Q), keys (K), and values (V) as inputs. In order to learn dependencies between distinct positions, SA computes the dot products of the query with all keys, and applies a softmax function to obtain the weights on the values.

$$SA(Q, K, V) = \text{softmax}\left(\frac{QK^T}{\sqrt{d}}\right)V \quad (2)$$

where d is the dimension of Q and K. With SA(Q,K,V), MSA is defined as:

$$MSA(Q,K,V) = \text{Concat}(\text{head}_1, \ldots, \text{head}_k)W^o$$

$$\text{where head}_i = SA(QW_i^Q, KW_i^K, VW_i^V) \quad (3)$$

where $W_i^Q$, $W_i^K$, $W_i^V$ are projections of different heads, $W^o$ is another mapping function. Intuitively, using multiple heads allows MSA to jointly attend to information from different representation subspaces at different positions.

In some examples, this disclosure first investigates ViT's ability in knowledge transfer on various adaptation tasks. After that, this disclosure conducts the early attempts to improve ViT's transferability by incorporating adversarial learning. Finally, this disclosure introduces the disclosed method named TVT, which consists of two new adaptation modules/kernels to further improve ViT's capability for cross-domain adaptation. Theses new adaptation modules/kernels may be deployed through one or more GPUs.

ViT's Transferability

To the best of our knowledge, the transferability of ViT has not been studied in the literature before, although ViT and its variants have shown great success in various vision task. To probe into ViT's capability of domain adaptation, in some examples, this disclosure chooses the vanilla ViT as the backbone in all studies, owing to its simplicity and popularity. This disclosure trains vanilla ViT by labeled source data only and assess its transferability by the classification accuracy on target data. As mentioned above, CNNs-based approaches dominate UDA research in the past decades and demonstrate great successes. Therefore, this disclosure compares vanilla ViT with CNNs-based architectures, including LeNet, AlexNet, and ResNet. All experiments are performed on well-established benchmarks with standard evaluation protocols.

Take the results on Office-31 dataset for example. As shown in Table 2 which illustrates performance comparison on Office-31 dataset, Source Only ViT obtains impressing classification accuracy 89.27%, which is much better than its strong CNN opponents AlexNet (70.1%) and ResNet (76.1%). Similar phenomenon can be observed in other benchmark results, where ViT competes favorably against, if not better than, the other state-of-the-arts CNNs backbones, as shown in Tables 1, and 3-4. Surprisingly, Source Only ViT even outperforms strong CNNs-based UDA approaches without any bells and whistles. For instance, it achieves an average accuracy 78.74% on Office-Home dataset, as shown in Table 3 which shows performance comparison on Office-Home dataset, beating all CNNbased UDA methods. Compared to SHOT recognized as the best UDA model nowadays, Source Only ViT obtains 7% absolute accuracy boost, a big step in pushing the frontier of UDA research. These evidences justify our hypothesis that ViT is more transferable, partially explained by its large-scale pre-training and global context modeling. However, as observed in Table 1 which shows performance comparison on digits dataset, a large gap still exists between the Source Only and Target Only models (88.3% vs 99.22%), which indicates further improvement space of ViT's transferability.

TABLE 1

| Algorithm | | S→M | U→M | M→U | Avg |
|---|---|---|---|---|---|
| Source Only | LeNet | 67.1 | 69.6 | 82.2 | 73.0 |
| RevGrad | | 73.9 | 73.0 | 77.1 | 74.7 |
| ADDA | | 76.0 | 90.1 | 89.4 | 85.2 |
| SHOT-IM | | 89.6 | 96.8 | 91.9 | 92.8 |
| CDAN | | 89.2 | 98.0 | 95.6 | 94.3 |
| CyCADA | | 90.4 | 96.5 | 95.6 | 94.2 |
| MCD | | 96.2 | 94.1 | 94.2 | 94.8 |
| Target Only | | 99.4 | 99.4 | 98.0 | 98.9 |
| Source Only | ViT | 88.58 | 88.23 | 73.09 | 88.30 |
| Baseline | | 92.70 | 98.60 | 97.01 | 96.10 |
| TVT | | 99.01 | 99.38 | 98.21 | 98.87 |
| Target Only | | 99.70 | 99.70 | 98.26 | 99.22 |

ViT with Adversarial Adaptation: Baseline

In some examples, this disclosure first investigates how ViT benefits from adversarial adaptation. This disclosure follows the typical adversarial adaptation fashion that employs an encoder $G_f$ 110 for feature learning, a classifier $G_c$ for classification, and a domain discriminator $D_g$ for global feature alignment. The classifier $G_c$ may be the classifier 124 shown in FIG. 1A and the domain discriminator $D_g$ may be the global-level domain discriminator 120 shown in FIG. 1A. Here, $G_f$ is implemented as ViT and $D_g$ is applied to output state of the class tokens of the source and target images. To accomplish domain knowledge adaptation, $G_f$ and $D_g$ play a minimax game: $G_f$ learns domain-invariant features to deceive $D_g$, while $D_g$ distinguishes source-domain features from that of target-domain. The objective can be formulated as:

$$\mathcal{L}_{clc}(x^s, y^s) = \frac{1}{n_s} \sum_{x_i \in \mathcal{D}_S} \mathcal{L}_{ce}(G_c(G_j(x_i^s)), y_i^s) \quad (4)$$

$$\mathcal{L}_{dis}(x^s, x^t) = -\frac{1}{n} \sum_{x_i \in \mathcal{D}} \mathcal{L}_{ce}(D_g(G_f(x_i^*)), y_i^d),$$

where $n = n_s + n_t$, $D = D_s \cup D_t$, $L_{ce}$ is cross-entropy loss, the superscript * can be either s or t to denote a source or a target domain, and $y^d$ denotes the domain label (i.e., $y^d = 1$ is source, $y^d = 0$ is target).

In some examples, this disclosure denotes ViT with adversarial adaptation as the Baseline. As shown in Tables 1, 2, 3, and 4, Baseline shows 7.8%, 0.15%, 1.56%, and 3.21% absolute accuracy improvements over vanilla ViT, respectively on the four benchmarks. Those results reveal that global feature alignment with a domain discriminator helps ViT's transferability. However, compared with the digit recognition task, Baseline achieves limited improvements on object detection which is more complicated and challenging. This disclosure boils down such observation to a conclusion that simply applying global adversarial alignment cannot exploit ViT's full transferable power, since it fails to consider two key factors: (i) not all regions/features are equally transferable or discriminative. For effective knowledge transfer, it is essential to focus on both transferable and discriminative features; (ii) ViT naturally provides fine-grained features given its forward passing sequential tokens, and attention weights in transformer actually convey discriminative potentials of patch tokens. To address these challenges and fully leverage the merits of ViT, a new UDA framework named TVT is further proposed.

TVT

Figure 1B:
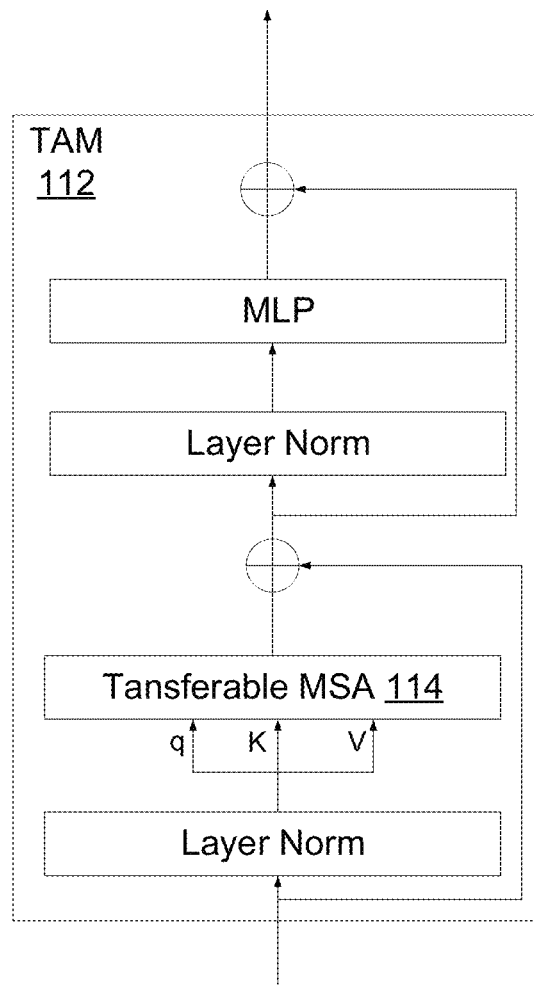
FIG. 1B is a block diagram illustrating an example of TAM in accordance with some implementations of the present disclosure.
Figure 1C:
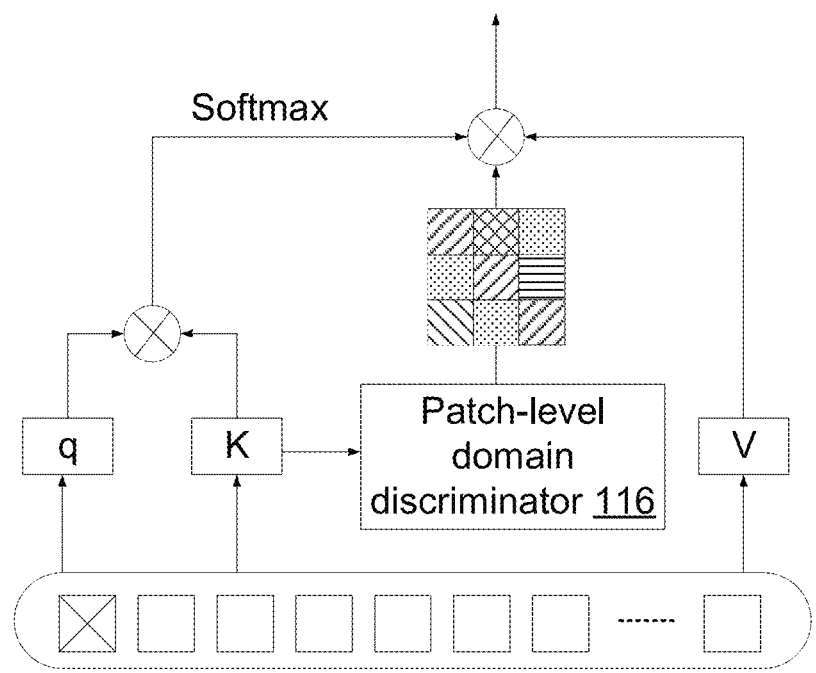
FIG. 1C is a block diagram illustrating an example of a transferable Multi-head Self-Attention (MSA) in accordance with some implementations of the present disclosure.

An overview of TVT is shown in FIGS. 1A-1C, which contain two main modules/kernels: (i) a TAM 112 and (ii) a DCM 122. These two modules are highly interrelated and play a complementary role in transferring knowledge for ViT-based architectures. TAM 112 encourages the output state of class token to focus on both transferable and semantic meaningful features, and DCM 122 enforces the aligned features of target-domain samples to be clustered with large margins. As a consequence, the features learnt by TVT are discriminative in classification and transferable across domains as well. This disclosure details each module/kernel in what follows.

TABLE 2

| Algorithm | | A→W | D→W | W→D | A→D | D→A | W→A | Avg |
|---|---|---|---|---|---|---|---|---|
| Source Only | AlexNet | 61.6 | 95.4 | 99.0 | 63.8 | 51.1 | 49.8 | 70.1 |
| DDC | | 61.8 | 95.0 | 98.5 | 64.4 | 52.1 | 52.2 | 70.6 |
| DAN | | 68.5 | 96.0 | 99.0 | 67.0 | 54.0 | 53.1 | 72.9 |
| RevGrad | | 73.0 | 96.4 | 99.2 | 72.3 | 53.4 | 51.2 | 74.3 |
| JAN | | 75.2 | 96.6 | 99.6 | 72.8 | 57.5 | 56.3 | 76.3 |
| CDAN | | 78.3 | 97.2 | 100.0 | 76.3 | 57.3 | 57.3 | 77.7 |
| PFAN | | 83.0 | 99.0 | 99.9 | 76.3 | 63.3 | 60.8 | 80.4 |
| Source Only | ResNet | 68.4 | 96.7 | 99.3 | 68.9 | 62.5 | 60.7 | 76.1 |
| DDC | | 75.6 | 96.0 | 98.2 | 76.5 | 62.2 | 61.5 | 78.3 |
| DAN | | 80.5 | 97.1 | 99.6 | 78.6 | 63.6 | 62.8 | 80.4 |
| RevGrad | | 82.0 | 96.9 | 99.1 | 79.7 | 68.2 | 67.4 | 82.2 |
| JAN | | 86.0 | 96.7 | 99.7 | 85.1 | 69.2 | 70.7 | 84.6 |
| TADA | | 94.3 | 98.7 | 99.8 | 91.6 | 72.9 | 73.0 | 88.4 |
| ALDA | | 95.6 | 97.7 | 100.0 | 94.0 | 72.2 | 72.5 | 88.7 |
| CDAN | | 94.1 | 98.6 | 100.0 | 92.9 | 71.0 | 69.3 | 87.7 |
| TAT | | 92.5 | 99.3 | 100.0 | 93.2 | 73.1 | 72.1 | 88.4 |
| SHOT | | 90.1 | 98.4 | 99.9 | 94.0 | 74.7 | 74.3 | 88.6 |
| Source Only | ViT | 87.67 | 98.87 | 100.0 | 86.35 | 81.43 | 81.29 | 89.27 |
| Baseline | | 91.70 | 98.87 | 100.0 | 86.75 | 79.87 | 79.34 | 89.42 |
| TVT | | 96.35 | 99.37 | 100.0 | 96.39 | 84.91 | 86.05 | 93.85 |

TABLE 3

| Algorithm | | Ar→Cl | Ar→Pr | Ar→Rw | Cl→Ar | Cl→Pr | Cl→Rw | Pr→Ar | Pr→Cl | Pr→Rw | Rw→Ar | Rw→Cl | Rw→Pr | Avg |
|---|---|---|---|---|---|---|---|---|---|---|---|---|---|---|
| Source Only | AlexNet | 26.4 | 32.6 | 41.3 | 22.1 | 41.7 | 42.1 | 20.5 | 20.3 | 51.1 | 31.0 | 27.9 | 54.9 | 34.3 |
| DAN | | 31.7 | 43.2 | 55.1 | 33.8 | 48.6 | 50.8 | 30.1 | 35.1 | 57.7 | 44.6 | 39.3 | 63.7 | 44.5 |
| RevGrad | | 36.4 | 45.2 | 54.7 | 35.2 | 51.8 | 55.1 | 31.6 | 39.7 | 59.3 | 45.7 | 46.4 | 65.9 | 47.3 |
| JAN | | 35.5 | 46.1 | 57.7 | 36.4 | 53.3 | 54.5 | 33.4 | 40.3 | 60.1 | 45.9 | 47.4 | 67.9 | 48.2 |
| Source Only | ResNet | 34.9 | 50.0 | 58.0 | 37.4 | 41.9 | 46.2 | 38.5 | 31.2 | 60.4 | 53.9 | 41.2 | 59.9 | 46.1 |
| DAN | | 43.6 | 57.0 | 67.9 | 45.8 | 56.5 | 60.4 | 44.0 | 43.6 | 67.7 | 63.1 | 51.5 | 74.3 | 56.3 |
| RevGrad | | 45.6 | 59.3 | 70.1 | 47.0 | 58.5 | 60.9 | 46.1 | 43.7 | 68.5 | 63.2 | 51.8 | 76.8 | 57.6 |
| JAN | | 45.9 | 61.2 | 68.9 | 50.4 | 59.7 | 61.0 | 45.8 | 43.4 | 70.3 | 63.9 | 52.4 | 76.8 | 58.3 |
| ALDA | | 53.7 | 70.1 | 76.4 | 60.2 | 72.6 | 71.5 | 56.8 | 51.9 | 77.1 | 70.2 | 56.3 | 82.1 | 66.6 |
| TADA | | 53.1 | 72.3 | 77.2 | 59.1 | 71.2 | 72.1 | 59.7 | 53.1 | 78.4 | 72.4 | 60.0 | 82.9 | 67.6 |
| CDAN | | 50.7 | 70.6 | 76.0 | 57.6 | 70.0 | 70.0 | 57.4 | 50.9 | 77.3 | 70.9 | 56.7 | 81.6 | 65.8 |
| TAT | | 51.6 | 69.5 | 75.4 | 59.4 | 69.5 | 68.6 | 59.5 | 50.5 | 76.8 | 70.9 | 56.6 | 81.6 | 65.8 |
| SHOT | | 57.1 | 78.1 | 81.5 | 68.0 | 78.2 | 78.1 | 67.4 | 54.9 | 82.2 | 73.3 | 58.8 | 84.3 | 71.8 |
| Source Only | ViT | 66.16 | 84.28 | 86.64 | 77.92 | 83.28 | 84.32 | 75.98 | 62.73 | 88.66 | 80.10 | 66.19 | 88.65 | 78.74 |
| Baseline | | 71.94 | 80.67 | 86.67 | 79.93 | 80.38 | 83.52 | 76.89 | 70.93 | 88.27 | 83.02 | 72.91 | 88.44 | 80.30 |
| TVT | | 74.89 | 86.82 | 89.47 | 82.78 | 87.95 | 88.27 | 79.81 | 71.94 | 90.13 | 85.46 | 74.62 | 90.56 | 83.56 |

TABLE 4

| Algorithm | | plane | bcycl | bus | car | house | knife | mcycl | person | plant | sktbrd | train | truck | Avg |
|---|---|---|---|---|---|---|---|---|---|---|---|---|---|---|
| Source Only | ResNet | 55.1 | 53.3 | 61.9 | 59.1 | 80.6 | 17.9 | 79.7 | 31.2 | 81.0 | 26.5 | 73.5 | 8.5 | 52.4 |
| RevGrad | | 81.9 | 77.7 | 82.8 | 44.3 | 81.2 | 29.5 | 65.1 | 28.6 | 51.9 | 54.6 | 82.8 | 7.8 | 57.4 |
| MCD | | 87.0 | 60.9 | 83.7 | 64.0 | 88.9 | 79.6 | 84.7 | 76.9 | 88.6 | 40.3 | 83.0 | 25.8 | 71.9 |
| ALDA | | 93.8 | 74.1 | 82.4 | 69.4 | 90.6 | 87.2 | 89.0 | 67.6 | 93.4 | 76.1 | 87.7 | 22.2 | 77.8 |
| DTA | | 93.7 | 82.2 | 85.6 | 83.8 | 93.0 | 81.0 | 90.7 | 82.1 | 95.1 | 78.1 | 86.4 | 32.1 | 81.5 |

TABLE 4-continued

| Algorithm | | plane | bcycl | bus | car | house | knife | mcycl | person | plant | sktbrd | train | truck | Avg |
|---|---|---|---|---|---|---|---|---|---|---|---|---|---|---|
| SHOT | | 94.3 | 88.5 | 80.1 | 57.3 | 93.1 | 94.9 | 80.7 | 80.3 | 91.5 | 89.1 | 86.3 | 58.2 | 82.9 |
| Source Only | ViT | 98.16 | 72.98 | 82.52 | 62.00 | 97.34 | 63.52 | 96.46 | 29.80 | 68.74 | 86.72 | 96.74 | 23.65 | 73.22 |
| Baseline | | 94.60 | 81.55 | 81.81 | 69.85 | 93.54 | 69.93 | 88.60 | 50.45 | 86.79 | 88.47 | 91.45 | 20.10 | 76.43 |
| TVT | | 92.92 | 85.58 | 77.51 | 60.48 | 93.60 | 98.17 | 89.35 | 76.40 | 93.56 | 92.02 | 91.69 | 55.73 | 83.92 |

TABLE 5

| Methods | Digits | Office-31 | Office-Home | VisDA-2017 | Avg |
|---|---|---|---|---|---|
| Source Only | 88.30 | 89.27 | 78.74 | 73.22 | 82.38 |
| +TAM | 97.20 | 91.21 | 81.30 | 79.30 | 87.21 |
| +DCM | 98.87 | 93.85 | 83.56 | 83.92 | 90.05 |

FIGS. 1A-1C are related to an overview of the proposed TVT framework in accordance with some implementations of the present disclosure. As in ViT, both source and target images 10 and 12 are split into fixed-size patches which are then linearly mapped and embedded with positional information. The generated patches are fed into a transformer encoder 110 whose last layer is replaced by TAM 112. TAM 112 is not limited to be the last layer in the transformer encoder 110 and may be any layer of multiple transformer layers 1, 2, . . . , L, where L is a positive integer. Further, FIG. 1A only illustrates the transformer encoder 110 as an example. A TAM can also be included into a transformer decoder. For example, the TAM 112 can also be a layer in a transformer decoder, such as one layer of multiple transformer layers in a transformer decoder. Feature learning, adversarial domain adaptation and classification are accomplished by ViT-akin backbone, two domain discriminators which are respectively on patch-level and global-level, DCM, and the multilayer perceptron (MLP) based classifier.

TAM

As shown in FIGS. 1A-1C, the TAM explicitly considers the intrinsic merits of ViT, i.e., attention mechanisms and sequential patch tokens. As the patch tokens are regarded as local features of an image, they are corresponded to different image regions or captures different visual aspects as fine-grained representations of an image. Assuming patch tokens of different semantic importance and transferability, TAM aims at assigning different weights to those tokens, to encourage the learned image representations, i.e., the output state of class token, to attend to patch tokens that are both transferable and discriminative. While the self-attention weights in ViT could be employed as discriminative weights, one major hurdle here is, the transferability of each patch token is not available. To bypass this difficulty, this disclosure adopts a patch-level domain discriminator $D_l$ 116 that matches cross-domain local features by optimizing:

$$\mathcal{L}_{pat}(x^s, x^t) = -\frac{1}{nR}\sum_{x_i \in \mathcal{D}}\sum_{r=1}^{R}\mathcal{L}_{ce}(D_l(G_f(x_{ir}^*)), y_{ir}^d), \quad (5)$$

where R is number of patches, and $D_l(f_{ir})$ is the probability of this region belonging to the source domain. During adversarial learning, $D_l$ tries to assign 1 for a source-domain patch and 0 for the target-domain ones, while $G_f$ combats such circumstances. Conceptually, a patch that can easily deceive $D_l$, e.g., $D_l$ is around 0.5, is more transferable across domains and should be given a higher transferability. This disclosure therefore uses $t_{ir}=T(f_{ir})=H(D_l(f_{ir})) \in [0,1]$ to measure the transferability of $r^{th}$ token of $i^{th}$ image, where $H(\cdot)$ is the standard entropy function. Another explanation of the transferability is: by assigning weights to different patches, it disentangles an image into common space representations and domain-specific representations, while the passing paths of domain-specific features are softly suppressed.

In some examples, this disclosure then converts the conventional MSA into the transferable MSA (T-MSA) 114, as shown in FIG. 1C, by transferability adaptation, i.e., injecting the learned transferabilities into attention weights of the class token. The T-MSA is built upon the transferable self-attention (TSA) block that is formally defined as:

$$TSA(q, K, V) = \text{softmax}\left(\frac{qK^T}{\sqrt{d}}\right) \odot [1; T(K_{patch})]V \quad (6)$$

where q is the query of the class token, $K_{patch}$ is the key of the patch tokens, $\odot$ is Hadamard product, and [;] is concatenation operation. Here, $$\text{softmax}\left(\frac{qK^T}{\sqrt{d}}\right)$$

and $[1; T(K_{patch})]$ indicate the discrimination (semantic importance) and the transferability of each patch token, respectively. To jointly attend to the transferabilities of different representation subspaces and of different locations, this disclosure thus defines T-MSA 114 as:

$$T\text{-}MSA(q,K,V)=\text{Concat}(\text{head}_1, \ldots, \text{head}_k)W^o$$

$$\text{where head}_i=TSA(qW_i^q, KW_i^K, VW_i^V) \quad (7)$$

Taken them together, this transformer gets the TAM as follows:

$$\hat{z}^l = T\text{-}MSA(LN(z^{l-1}))+z^{l-1}$$

$$z^l = MLP(LN(\hat{z}^l))+\hat{z}^l \quad (8)$$

In some examples, this disclosed method only applies TAM to the last transformer layer where patch features are spatially non-local and of higher semantic meanings. By this means, TAM focuses on fine-grained features that are transferable across domains and are discriminative for classification. Here, l=L, where L is the total number of transformer layers in ViT.

DCM

Towards the challenging problem of learning a probabilistic discriminative classifier with unlabeled target data, it is desirable to minimize the expected classification error on the target domain. However, cross-domain feature alignment through TAM by forcing the two domains to be similar may destroy the discriminative information of the learned representation, if no semantic constrains of the target domain is introduced. FIGS. 2A-2D show t-SNE visualization of VisDA-2017 dataset, where grey and black points indicate the source (synthetic rendering) and the target (real images) domain, respectively. FIG. 2A illustrate t-SNE visualization of VisDA-2017 dataset based on Source Only ViT in accordance with some implementations of the present disclosure. FIG. 2B illustrate t-SNE visualization of VisDA-2017 dataset based on Baseline in accordance with some implementations of the present disclosure. FIG. 2C illustrates t-SNE visualization of VisDA-2017 dataset based on TAM in accordance with some implementations of the present disclosure. FIG. 2D illustrates t-SNE visualization of VisDA-2017 dataset based on TVT in accordance with some implementations of the present disclosure.

As shown in FIGS. 2A-2D, although the target feature is indistinguishable from the source feature, it is distributed in a mess which limits its discriminative power. To address this limitation, this disclosure is inspired by the assumptions that: (i) $p^t=\text{softmax}(G_c(G_f(x^t)))$ are expected to retain as much information about $x^t$ as possible; and (ii) decision boundary should not cross high-density regions, but instead lie in low density regions, which is also known as cluster assumption. Fortunately, these two assumptions can be met by maximizing mutual information between the empirical distribution on the target inputs and the induced target label distribution, which can be formally defined as:

$$\mathcal{J}(p^t; x^t) = H(\overline{p^t}) - \frac{1}{n_t}\sum_{j=1}^{n_t} H(p_j^t) = -\sum_{k=1}^{K} \overline{p_k^t}\log(\overline{p_k^t}) + \frac{1}{n_t}\sum_{j=1}^{n_t}\sum_{k=1}^{K} p_{jk}^t \log(p_{jk}^t) \quad (9)$$

where $p_j^t=\text{softmax}(G_c(G_f(x_j^t)))$, $\overline{p^t}=E_{x_t}[p^t]$, and K is the number of classes. Note that maximizing $$-\frac{1}{n_t}\sum_{j=1}^{n_t} H(p_j^t)$$

enforces the target predictions close to one-hot encoding, therefore the cluster assumption is guaranteed. To ensure the global diversity, this disclosure also maximizes $H(\overline{p^t})$ to avoid that every target data is assigned to the same class. With $J(p^t;x^t)$, the proposed model is encouraged to learn tightly clustered target features with uniform distribution, such that the discriminative information in the target domain are retained.

To summarize, the objective function of TVT is:

$$L_{clc}(x^s,y^s)+\alpha L_{dis}(x^s,x^t)+\beta L_{pat}(x^s,x^t)-\gamma J(p^t;x^t) \quad (10)$$

where $\alpha$, $\beta$, and $\gamma$ are hyper-parameters.

To verify the effectiveness of the proposed model, this disclosure conducts comprehensive studies on commonly used benchmarks and present experimental comparisons against state-of-the-art UDA methods as shown below.

Digits is an UDA benchmark on digit classification. This disclosure follows the same setting in previous work to perform adaptations on MNIST, USPS, and Street View House Numbers (SVHN). For each source-target domain pair, this disclosure trains the proposed model using the training sets of each domain and performs evaluations on the standard test set of the target domain.

Office-31 contains 4,652 images of 31 categories, which were collected from three domains: Amazon (A), DSLR (D), and Webcam (W). The Amazon (A) image were downloaded from amazon.com, while the DSLR (D), and Webcam (W) were photoed under the office environment by web and digital SLR camera, respectively.

Office-Home consists of images from four different domains: Artistic images (Ar), Clip Art (Cl), Product images (Pr), and Real-World images (Rw). A total of 65 categories are covered within each domain.

VisDA-2017 is a synthesis-to-real object recognition task used for the 2018 VisDA challenge. It covers 12 categories. The source domain contains 152,397 synthetic 2D renderings generated from different angles and under different lighting conditions, while the target domain contains 55,388 real-world images.

Baseline Methods: This disclosure compares with RevGrad, ADDA, SHOT, CDAN, CyCADA, MCD, DDC, DAN, JAN, PFAN, TADA, ALDA, TAT, and DTA, under the closest setting where the source and the target domain share the same label space. This disclosure uses the results in their original papers for fair comparison. For each type of backbone, this disclosure reports its lower bound performance, denoted as Source Only, meaning the models are trained with source data only. For digit recognition, this disclosure also shows the Target Only results as the high-end performance, which is obtained by both training and testing on the labeled target data. Baseline denotes vanilla ViT with adversarial adaptation.

Implementation Details: The ViT-Base with 16×16 input patch size (or ViT-B/16) pre-trained on ImageNet is used as the backbone. The transformer encoder of ViT-B/16 contains 12 transformer layers in total. This disclosure trains all ViT-based models using minibatch Stochastic Gradient Descent (SGD) optimizer with the momentum of 0.9. This disclosure initialized the learning rate as 0 and linearly increase it to 0.03 after 500 training steps. This disclosure then decreases it by the cosine decay strategy.

Results of Digit: Recognition For the digit recognition task, this disclosure performs evaluations on SVHN→MNISt, USPS→MNIST, and MNIST→USPS, following the standard evaluation protocol of UDA. Shown in Table 1, TVT obtains the best mean accuracy for each task and outperforms prior work in terms of the average classification accuracy. TVT also performs better than Baseline (+2.7%) due to the contribution of the proposed TAM and DCM. In particular, TVT achieves comparable results to Target Only model, indicating that the domain shift problem is well alleviated.

Results of Object Recognition: For object recognition task, Office-31, Office-Home, and VisDA-2017 are used in evaluation. As shown in Tables 2-4, TVT sets up new benchmark results for all the three datasets. On the medium-sized Office-Home dataset (Table 3), this disclosure achieves the significant improvement over the best prior UDA method (83.56% vs 71.8%). Results on the large-scale VisDA-2017 dataset, shown in Table 4 which illustrates Performance comparison on VisDA-2017 dataset, show that this disclosure not only achieves a higher average accuracy, but also competes favorably against ALDA and SHOT that rely on pseudo labels. Training with pseudo label may give TVT extra accuracy gain. Note that DTA also enforces the cluster assumption to learn discriminative features, but it fails to encourage the global diversity which may leads to a degenerate solution where every point is assigned to the same class. Besides, TVT surpasses both Source Only and Baseline, revealing its effectiveness in transferring domain knowledge by (i) capturing both transferable and discriminative fine-grained features and (ii) retaining discriminative information while searching for the domain-invariant representations. This is also evidenced by the t-SNE visualization of learned features as showcased in FIGS. 2A-2D. Obviously, TAM can effectively align source and target domain features by exploiting the local feature transferability. However, the target feature is not well-separated due to that target labels in training are absent and the discriminative information are destroyed by adversarial alignment. Fortunately, this problem is alleviated by DCM by assuming that datapoints should be classified with large margin, as illustrated in FIG. 2D.

Ablation Study: To learn the individual contribution of TAM and DCM in improving the knowledge transferability of ViT, this disclosure conducts the ablation study in Table 5. Compared to Source Only, TAM consistently improves the classification accuracy with average 4.38% boost, indicating the significance of capturing both transferable and discriminative features. The performance is further improved by incorporating DCM, justifying the necessary of retaining the discriminative information of the learned representation. It is noteworthy that DCM brings the largest improvement on the large-scale synthetic-to-real VisDA-2017 dataset. This disclosure suspects that the large domain gap in VisDA-2017 (synthetic 2D rendering to natural image) is the leading reason, since simply aligning two domains with large domain shift results in a mess distributed feature space. This challenge, however, can be largely addressed by DCM that enables retaining discriminative information based on a cluster assumption.

Figure 3C:
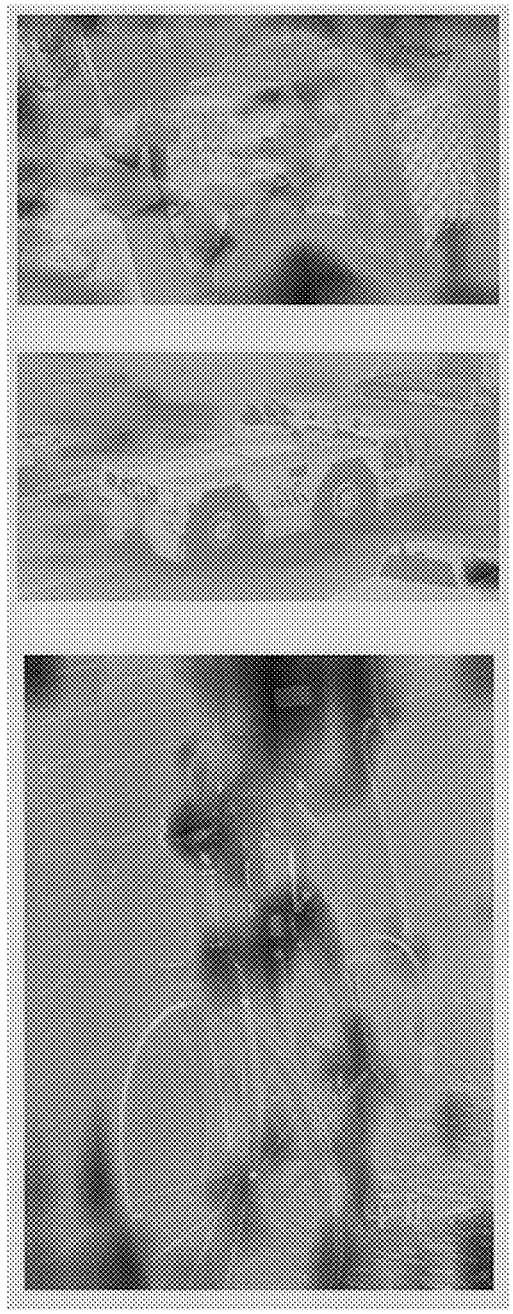
FIG. 3C illustrates attention visualization of the person, the truck, and the bicycle as shown in FIG. 3A based on Baseline in accordance with some implementations of the present disclosure.
Figure 3D:
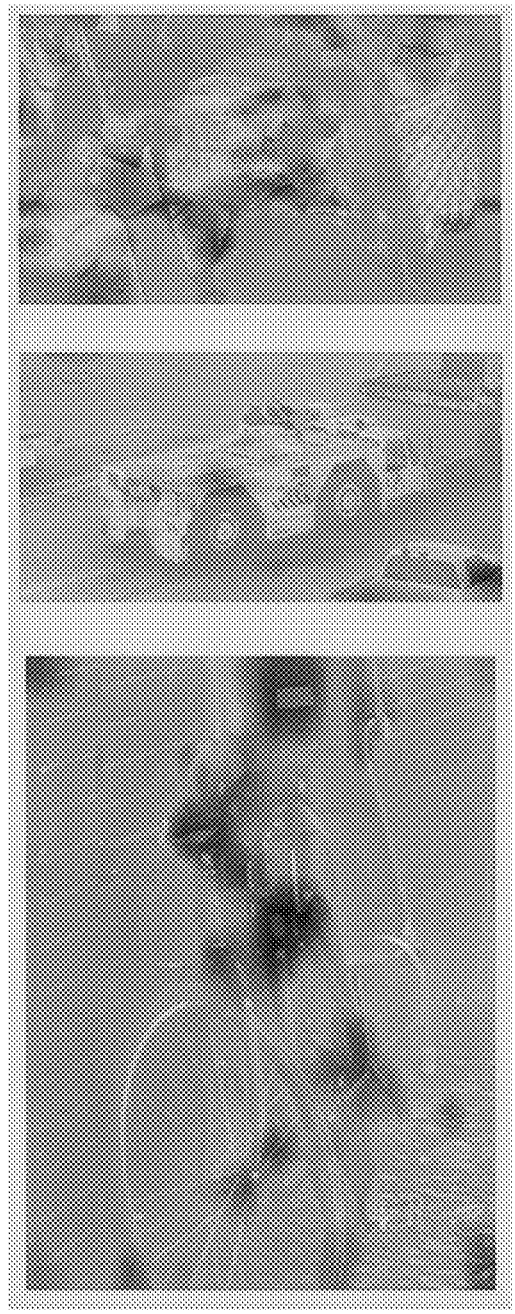
FIG. 3D illustrates attention visualization of the person, the truck, and the bicycle as shown in FIG. 3A based on TVT in accordance with some implementations of the present disclosure.

Attention Visualization: This disclosure visualizes the attention map of the class token in TAM to verify that the proposed model can attend to local features that are both transferable and discriminative. Without loss of generality, this disclosure randomly samples target-domain images in VisDA-2017 dataset for comparison. FIGS. 3A-3D shows attention map visualization of person, truck, and bicycle in VisDA-2017 dataset. The hotter or darker the color, the higher the attention. FIG. 3A illustrates three real images of person, truck, and bicycle in VisDA-2017 dataset. FIG. 3B illustrates attention map visualization of the person, the truck, and the bicycle as shown in FIG. 3A based on Source Only ViT in accordance with some implementations of the present disclosure. FIG. 3C illustrates attention visualization of the person, the truck, and the bicycle as shown in FIG. 3A based on Baseline in accordance with some implementations of the present disclosure. FIG. 3D illustrates attention visualization of the person, the truck, and the bicycle as shown in FIG. 3A based on TVT in accordance with some implementations of the present disclosure.

As shown in FIGS. 3A-3D, the disclosed method captures more accurate regions than Source Only and Baseline. For instance, to recognize the person in the top-left image, Source Only mainly focus on women's shoulder which is discriminative yet not highly transferable. Moving beyond the shoulder region, the baseline also attends to faces and hands that can generalize well across domains. The disclosed method, instead, ignores the shoulder and only highlight those regions that are important for classification and transferable. Certainly, by leveraging the intrinsic attention mechanism and fine-grained features captured by sequential patches, the disclosed method promotes the capability of ViT in transferring domain knowledge.

This disclosure performs the first-of-its-kind investigation of ViT's transferability in UDA task and observe that ViT are more transferable than CNNs counterparts. To further improve the power of ViT in transferring domain knowledge, this disclosure proposes TVT by explicitly considering the intrinsic merits of transformer architecture. Specifically, TVT captures both transferable and discriminative features in the given image, and retains discriminative information of the learnt domain-invariant representations. Experimental results on widely used benchmarks show that TVT outperforms prior UDA methods by a large margin.

FIG. 4 is a block diagram illustrating an apparatus for training a TVT for UDA in heterogeneous devices in accordance with some implementations of the present disclosure. The apparatus 400 may be a terminal, such as a mobile phone, a tablet computer, a digital broadcast terminal, a tablet device, or a personal digital assistant.

As shown in FIG. 4, the apparatus 400 may include one or more of the following components: a processing component 402, a memory 404, a power supply component 406, a multimedia component 408, an audio component 410, an input/output (I/O) interface 412, a sensor component 414, and a communication component 416.

The processing component 402 usually controls overall operations of the apparatus 400, such as operations relating to display, a telephone call, data communication, a camera operation, and a recording operation. The processing component 402 may include one or more processors 420 for executing instructions to complete all or a part of steps of the above method. Further, the processing component 402 may include one or more modules to facilitate interaction between the processing component 402 and other components. For example, the processing component 402 may include a multimedia module to facilitate the interaction between the multimedia component 408 and the processing component 402.

The memory 404 is configured to store different types of data to support operations of the apparatus 400. Examples of such data include instructions, contact data, phonebook data, messages, pictures, videos, and so on for any application or method that operates on the apparatus 400. The memory 404 may be implemented by any type of volatile or non-volatile storage devices or a combination thereof, and the memory 404 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 406 supplies power for different components of the apparatus 400. The power supply component 406 may include a power supply management system, one or more power supplies, and other components associated with generating, managing, and distributing power for the apparatus 400.

The multimedia component 408 includes a screen providing an output interface between the apparatus 400 and a user. In some examples, the screen may include a Liquid Crystal Display (LCD) and a Touch Panel (TP). If the screen includes a touch panel, the screen may be implemented as a touch screen receiving an input signal from a user. The touch panel may include one or more touch sensors for sensing a touch, a slide, and a gesture on the touch panel. The touch sensor may not only sense a boundary of a touching or sliding actions, but also detect duration and pressure related to the touching or sliding operation. In some examples, the multimedia component 408 may include a front camera and/or a rear camera. When the apparatus 400 is in an operation mode, such as a shooting mode or a video mode, the front camera and/or the rear camera may receive external multimedia data.

The audio component 410 is configured to output and/or input an audio signal. For example, the audio component 410 includes a microphone (MIC). When the apparatus 400 is in an operating mode, such as a call mode, a recording mode and a voice recognition mode, the microphone is configured to receive an external audio signal. The received audio signal may be further stored in the memory 404 or sent via the communication component 416. In some examples, the audio component 410 further includes a speaker for outputting an audio signal.

The I/O interface 412 provides an interface between the processing component 402 and a peripheral interface module. The above peripheral interface module may be a keyboard, a click wheel, a button, or the like. These buttons may include but not limited to, a home button, a volume button, a start button, and a lock button.

The sensor component 414 includes one or more sensors for providing a state assessment in different aspects for the apparatus 400. For example, the sensor component 414 may detect an on/off state of the apparatus 400 and relative locations of components. For example, the components are a display and a keypad of the apparatus 400. The sensor component 414 may also detect a position change of the apparatus 400 or a component of the apparatus 400, presence or absence of a contact of a user on the apparatus 400, an orientation or acceleration/deceleration of the apparatus 400, and a temperature change of apparatus 400. The sensor component 414 may include a proximity sensor configured to detect presence of a nearby object without any physical touch. The sensor component 414 may further include an optical sensor, such as a CMOS or CCD image sensor used in an imaging application. In some examples, the sensor component 414 may further include an acceleration sensor, a gyroscope sensor, a magnetic sensor, a pressure sensor, or a temperature sensor.

The communication component 416 is configured to facilitate wired or wireless communication between the apparatus 400 and other devices. The apparatus 400 may access a wireless network based on a communication standard, such as WiFi, 4G, or a combination thereof. In an example, the communication component 416 receives a broadcast signal or broadcast related information from an external broadcast management system via a broadcast channel. In an example, the communication component 416 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 400 may be implemented by one or more of Application Specific Integrated Circuits (ASIC), Digital Signal Processors (DSPs), Digital Signal Processing Devices (DSPD), Programmable Logic Devices (PLD), Field Programmable Gate Arrays (FPGA), graphics processing units (GPUs), controllers, microcontrollers, microprocessors, or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk, etc.

FIG. 5 is a flowchart illustrating a process of training a TVT for UDA in accordance with some implementations of the present disclosure.

In step 502, the processor 420 loads multiple patches into the TVT which includes a TAM.

In some examples, the TVT includes an encoder which includes multiple encoder layers, and the TAM is one of the multiple encoder layers, as shown in FIG. 1A.

In some examples, the TVT includes a decoder which includes multiple decoder layers, and the TAM is one of the multiple decoder layers.

In some examples, the TVT may include the encoder and the decoder. Each transformer layer, such as an encoder layer or a decoder layer, may be implemented on one or more GPUs in a heterogeneous device.

In step 504, the processor 420 assigns weights to the multiple patches and determines one or more transferable patches based on the weights by a patch-level domain discriminator in the TAM.

In some examples, the patch-level domain discriminator may be the patch-level domain discriminator $D_l$ 116 as shown in FIG. 1C.

In some examples, the multiple patches include a first set of source domain patches from a source image and a second set of target domain patches from a target image. For example, the source image may be the source image 10 shown in FIG. 1A and the target image may be the target image 12 shown in FIG. 1A.

In some examples, the processor 420 may further assign a first weight to a source domain patch, assign a second weight to a target domain patch, and determine a transferable patch having a weight within a range between the first weight and the second weight. For example, the patch-level domain discriminator assigns 1 for a source-domain patch and 0 for the target domain patch. A patch that can easily deceive the patch-level domain discriminator $D_l$, e.g., $D_l$ is around 0.5, is more transferable across domains and should be given a higher transferability.

In step 506, the processor 420 generates a transferable attention output for an attention module in the TAM based on the one or more transferable patches.

Figure 6:
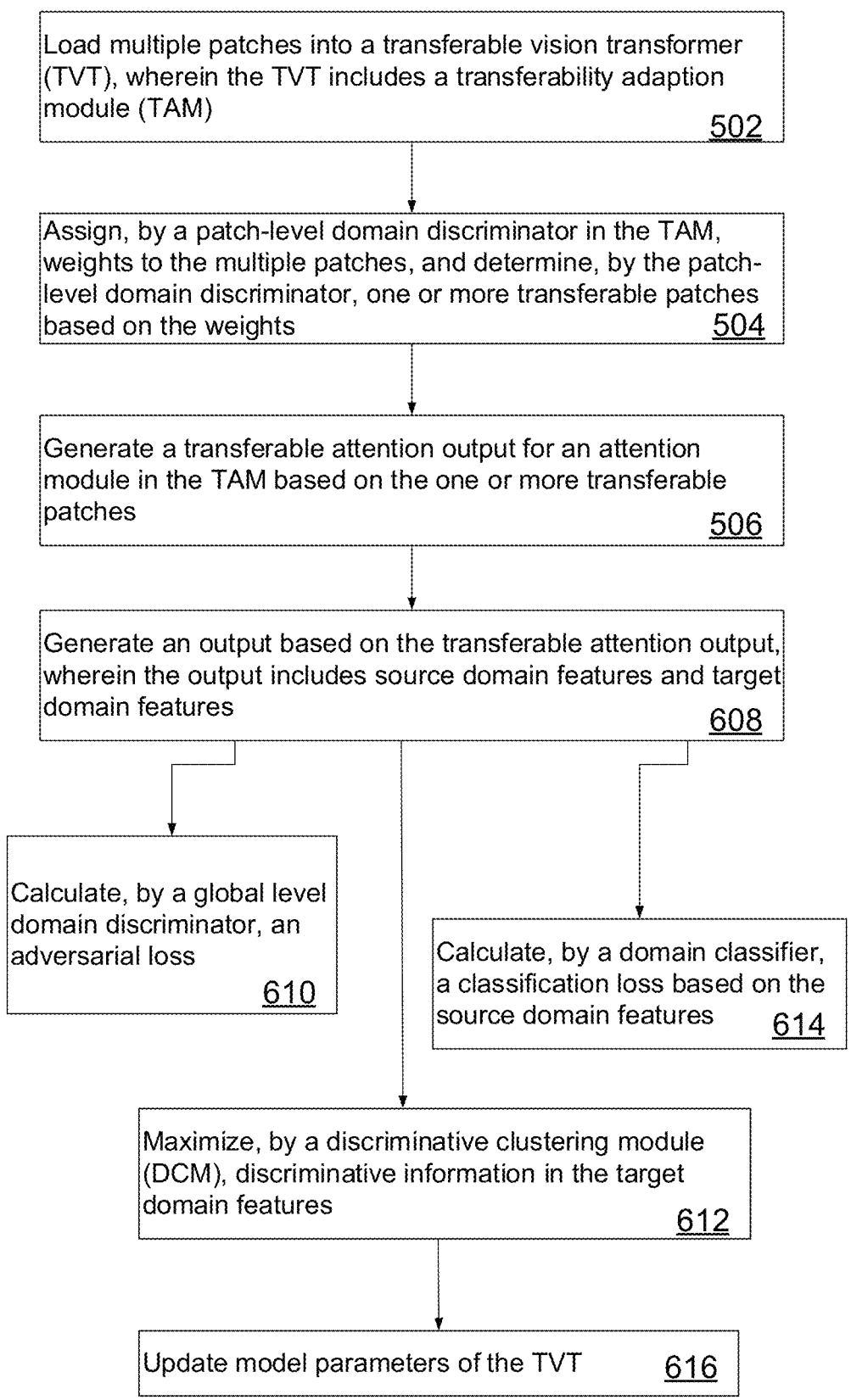
FIG. 6 is a flowchart illustrating a process of training a TVT for UDA in accordance with some implementations of the present disclosure.

Furthermore, as shown in FIG. 6, in step 608, the processor 420 may generate an output based on the transferable attention output, where the output includes source domain features and target domain features.

In some examples, as shown in step 610, the processor 420 may calculate an adversarial loss by a global level domain discriminator. The global level domain discriminator may be the global level domain discriminator 120 shown in FIG. 1A.

In some examples, the source domain features and the target domain features may respectively include class tokens and patch tokens, each class token is prepended to multiple patch tokens and serves as a presentation of a whole image. The global level domain discriminator may calculate the adversarial loss based on each class token. For example, as shown in FIG. 1A, source domain feature sequences such as S0 or S1, and target domain feature sequences such as T0 or T1, each of which include a class token which is a cross marked block shown in FIG. 1A and multiple patch tokens which are blank blocks shown in FIG. 1A.

In some examples, as shown in step 612, the processor 420 may maximize discriminative information in the target domain features by a DCM. For example, the DCM may be the DCM 122 as shown in FIG. 1A.

In some examples, as shown in step 614, the processor 420 may calculate a classification loss based on the source domain features by a domain classifier. For example, the domain classifier may be the classifier 124 as shown in FIG. 1A.

In some examples, as shown in step 616, the processor 420 may further update model parameters of the TVT based on the losses calculated in steps 610, 612, and 614 above, such as based on the adversarial loss to distinguish the source domain features from the target domain features.

In some examples, there is provided an apparatus for training a TVT for UDA in heterogeneous devices. The apparatus includes one or more processors 420 and a memory 404 configured to store instructions executable by the one or more processors; where the processor, upon execution of the instructions, is configured to perform any method as described in FIGS. 5-6 and above.

In some other examples, there is provided a non-transitory computer readable storage medium 404, having instructions stored therein. When the instructions are executed by one or more processors 420, the instructions cause the processor to perform any method as described in FIGS. 5-6 and above.

The description of the present disclosure has been presented for purposes of illustration and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for training a transferable vision transformer (TVT) for unsupervised domain adaption (UDA) in heterogeneous devices, comprising:
    loading, by a heterogeneous device comprising one or more graphic processing units (GPUs), multiple patches into the TVT, wherein the TVT comprises a transferability adaption module (TAM);
    assigning, by a patch-level domain discriminator in the TAM, weights to the multiple patches, based on transferabilities of the multiple patches measured by the patch-level domain discriminator, and determining, by the patch-level domain discriminator, one or more transferable patches based on the weights;
    generating, by the heterogeneous device, a transferable attention output for an attention module in the TAM based on the one or more transferable patches; and
    generating an output based on the transferable attention output, wherein the output comprises source domain features and target domain features,
    wherein the source domain features and the target domain features comprise class tokens and patch tokens, wherein each class token is prepended to multiple patch tokens and serves as a presentation of a whole image, and the patch tokens give free access to fine-grained features that are both transferable and discriminative.

2. The method of claim 1, wherein the TVT comprises an encoder comprising multiple encoder layers comprising the TAM, or wherein the TVT comprises a decoder comprising multiple decoder layers comprising the TAM.

3. The method of claim 1, wherein the multiple patches comprise a first set of source domain patches from a source image and a second set of target domain patches from a target image; and
    wherein the method further comprises:
        assigning a first weight to a source domain patch;
        assigning a second weight to a target domain patch; and
        determining a transferable patch having a weight between the first weight and the second weight.

4. The method of claim 1, further comprising:
    calculating, by a global level domain discriminator, an adversarial loss and updating model parameters of the TVT based on the adversarial loss to distinguish the source domain features from the target domain features.

5. The method of claim 4,
    wherein the method further comprises:
    calculating, by the global level domain discriminator, the adversarial loss based on each class token.

6. The method of claim 4, further comprising:
    maximizing, by a discriminative clustering module (DCM), discriminative information in the target domain features.

7. The method of claim 4, further comprising:
    calculating, by a domain classifier, a classification loss based on the source domain features and updating the model parameters of the TVT to minimize the classification loss.

8. An apparatus for training a transferable vision transformer (TVT) for unsupervised domain adaption (UDA) in heterogeneous devices, comprising:
    one or more processors; and
    a memory configured to store instructions executable by the one or more processors,
    wherein the one or more processors, upon execution of the instructions, are configured to:
    load multiple patches into the TVT, wherein the TVT comprises a transferability adaption module (TAM);
    assign, by a patch-level domain discriminator in the TAM, weights to the multiple patches, based on transferabilities of the multiple patches measured by the patch-level domain discriminator, and determine, by the patch-level domain discriminator, one or more transferable patches based on the weights;
    generate a transferable attention output for an attention module in the TAM based on the one or more transferable patches; and
    generate an output based on the transferable attention output, wherein the output comprises source domain features and target domain features,
    wherein the source domain features and the target domain features comprise class tokens and patch tokens, wherein each class token is prepended to multiple patch tokens and serves as a presentation of a whole image, and the patch tokens give free access to fine-grained features that are both transferable and discriminative.

9. The apparatus of claim 8, wherein the TVT comprises an encoder comprising multiple encoder layers comprising the TAM, or wherein the TVT comprises a decoder comprising multiple decoder layers comprising the TAM.

10. The apparatus of claim 8, wherein the multiple patches comprise a first set of source domain patches from a source image and a second set of target domain patches from a target image; and
    wherein the one or more processors are further configured to:
        assign a first weight to a source domain patch;
        assign a second weight to a target domain patch; and
        determine a transferable patch having a weight between the first weight and the second weight.

11. The apparatus of claim 8,
calculate, by a global level domain discriminator, an adversarial loss and updating model parameters of the TVT based on the adversarial loss to distinguish the source domain features from the target domain features.

12. The apparatus of claim 11, wherein the one or more processors are further configured to:
calculate, by the global level domain discriminator, the adversarial loss based on each class token.

13. The apparatus of claim 11, wherein the one or more processors are further configured to:
maximize, by a discriminative clustering module (DCM), discriminative information in the target domain features.

14. The apparatus of claim 11, wherein the one or more processors are further configured to:
calculate, by a domain classifier, a classification loss based on the source domain features and update the model parameters of the TVT to minimize the classification loss.

15. A non-transitory computer readable storage medium, comprising instructions stored therein, wherein, upon execution of the instructions by one or more processors, the instructions cause the one or more processors to perform acts comprising:
loading multiple patches into a transferable vision transformer (TVT), wherein the TVT comprises a transferability adaption module (TAM);
assigning, by a patch-level domain discriminator in the TAM, weights to the multiple patches, based on transferabilities of the multiple patches measured by the patch-level domain discriminator, and determining, by the patch-level domain discriminator, one or more transferable patches based on the weights;
generating a transferable attention output for an attention module in the TAM based on the one or more transferable patches; and
generating an output based on the transferable attention output, wherein the output comprises source domain features and target domain features,
wherein the source domain features and the target domain features comprise class tokens and patch tokens, wherein each class token is prepended to multiple patch tokens and serves as a presentation of a whole image, and the patch tokens give free access to fine-grained features that are both transferable and discriminative.

16. The non-transitory computer readable storage medium of claim 15, wherein the TVT comprises an encoder comprising multiple encoder layers comprising the TAM, or wherein the TVT comprises a decoder comprising multiple decoder layers comprising the TAM.

17. The non-transitory computer readable storage medium of claim 15, wherein the multiple patches comprise a first set of source domain patches from a source image and a second set of target domain patches from a target image; and
wherein the instructions cause the one or more processors to perform acts further comprising:
assigning a first weight to a source domain patch;
assigning a second weight to a target domain patch; and
determining a transferable patch having a weight between the first weight and the second weight.

18. The non-transitory computer readable storage medium of claim 15, wherein the instructions cause the one or more processors to perform acts further comprising:
calculating, by a global level domain discriminator, an adversarial loss and updating model parameters of the TVT based on the adversarial loss to distinguish the source domain features from the target domain features.

19. The non-transitory computer readable storage medium of claim 18,
wherein the instructions cause the one or more processors to perform acts further comprising:
calculating, by the global level domain discriminator, the adversarial loss based on each class token.

20. The non-transitory computer readable storage medium of claim 18, wherein the instructions cause the one or more processors to perform acts further comprising:
maximizing, by a discriminative clustering module (DCM), discriminative information in the target domain features.

* * * * *